United States Patent [19]
Thomsen et al.

[11] Patent Number: 5,370,586
[45] Date of Patent: Dec. 6, 1994

[54] TENSION REGULATING DEVICE FOR BELT DRIVES

[75] Inventors: H. Jay Thomsen, Detroit; William Ordo, Lincoln Park, both of Mich.

[73] Assignee: Hasco Spring Industries, Inc., Southfield, Mich.

[21] Appl. No.: 74,102

[22] Filed: Jun. 9, 1993

Related U.S. Application Data

[63] Continuation-in-part of Ser. No. 919,601, Jul. 22, 1992, abandoned.

[51] Int. Cl.$^5$ .................................................. F16H 7/12
[52] U.S. Cl. ................................ 474/135; 267/275; 267/155
[58] Field of Search .................. 474/133, 134, 135; 267/154, 165, 173, 155, 180, 167, 275, 289, 290

[56] References Cited

U.S. PATENT DOCUMENTS

| | | | |
|---|---|---|---|
| 492,465 | 2/1893 | Fender | 267/155 |
| 633,328 | 9/1899 | Roberts | 267/155 |
| 736,333 | 8/1903 | Meyer | 267/155 |
| 740,114 | 9/1903 | Fiske | 267/155 |
| 1,435,101 | 11/1922 | Brisbois | 267/155 X |
| 1,594,301 | 7/1926 | Heymer | 267/155 |
| 1,859,531 | 5/1932 | Ross | 267/155 X |
| 2,503,149 | 4/1950 | Bonnemort | |
| 2,558,311 | 6/1951 | Morrow | 267/275 |
| 2,728,188 | 12/1955 | Hettich | 267/155 X |
| 3,091,947 | 6/1963 | Thomsen | |
| 4,285,676 | 8/1981 | Kraft | 474/135 |
| 4,309,174 | 1/1982 | Sproul | 474/135 |
| 4,504,254 | 3/1985 | Foster | 474/133 |
| 4,525,152 | 6/1985 | Speer et al. | 474/133 |
| 4,536,172 | 8/1985 | Burris et al. | 474/135 |
| 4,557,709 | 12/1985 | St. John | 474/135 X |
| 4,563,167 | 1/1986 | Foster | 474/135 |
| 4,596,538 | 6/1986 | Henderson | 474/135 |
| 4,601,683 | 7/1986 | Foster | 474/135 |
| 4,728,318 | 3/1988 | Henderson | 474/135 |
| 4,784,631 | 11/1988 | Henderson | 474/135 |
| 4,808,148 | 2/1989 | Holtz | 474/135 X |
| 4,832,666 | 5/1989 | Henderson | 474/135 |
| 4,886,483 | 12/1989 | Henderson | 474/135 |
| 4,902,267 | 2/1990 | Henderson | 474/133 |
| 4,906,222 | 3/1990 | Henderson | 474/135 |
| 4,908,007 | 3/1990 | Henderson | 474/135 |
| 4,938,734 | 7/1990 | Green et al. | 474/135 |
| 4,950,207 | 8/1990 | Henderson | 474/133 |
| 4,952,197 | 8/1990 | Henderson | 474/135 |
| 4,971,589 | 11/1990 | Sidwell et al. | 474/135 |
| 4,978,326 | 12/1990 | Henderson | 474/135 |
| 4,981,461 | 1/1991 | Henderson | 474/135 |
| 4,985,010 | 1/1991 | Henderson | 474/135 |

Primary Examiner—Roger J. Schoeppel
Attorney, Agent, or Firm—Harness, Dickey & Pierce

[57] ABSTRACT

There is provided a belt tensioning apparatus for maintaining the tension in the belt of a serpentine belt drive system. The belt tensioning apparatus utilizes a double wrap spiral spring which will approximately double the amount of travel of the tensioning apparatus for a given outside diameter. This significant increase in travel allows the tensioning device to be preset at a variety of initial loads to enable the same tensioner to be used over a broad range of applications.

24 Claims, 5 Drawing Sheets

TENSION REGULATING DEVICE FOR BELT DRIVES

CROSS REFERENCE TO RELATED APPLICATIONS

This application is a continuation-in-part of U.S. application Ser. No. 07/919,601, filed Jul. 22, 1992, entitled "Tension Regulating Device for Belt Drives", now abandoned.

FIELD OF THE INVENTION

This invention relates to a serpentine belt driving system. More particularly, this invention relates to an apparatus for continuously maintaining tension in the belt drive of the serpentine belt drive system.

BACKGROUND OF THE INVENTION

It is well known in the art to provide an apparatus to maintain the tension in a power transmission belt which is adapted to be operated in an endless path. The tensioner maintains a constant tension on the belt to insure proper operation of the various driven devices. The tensioner is required due to changes in the belt length caused by belt wear, stretching, temperature variations, etc. Accordingly, in both automotive and non-automotive applications, various tensioning devices have been developed to compensate for these changes in belt length.

The present invention will be described incorporated into an endless belt drive system commonly used in automotive vehicles to power the various accessories. It is understood that the present invention is not to be limited to automotive accessory applications and is equally applicable to other automotive and non-automotive belt drive systems.

An automotive belt drive system normally receives power from the crankshaft and is used to power various accessories including alternators, water pumps, fans, air pumps, air conditioning compressors, power steering pumps and the like. In order to maintain proper tension on the belt as it drives these accessories, a spring loaded idler pulley is sometimes positioned within the system to constantly apply a load or tension on the belt to insure the belt will maintain engagement with the various drive pulleys and maintain a sufficient load or tension on the belt to insure the driving of the accessories.

Various designs of spring loaded idler pulleys have been developed. Some designs simply place tension on the belt, other designs incorporate braking mechanisms which resist movement of the pulley in a specific direction and still others incorporate a damping device which tends to isolate the movement of the idler pulley with respect to various natural frequencies encountered by the belt drive system.

Most of the prior art belt tensioning devices incorporate a spiral spring. The term spiral spring will be used throughout this disclosure to describe the present invention. It is to be understood that the term spiral spring includes clock wound springs, power springs or any other spring of similar construction. Normally, spiral springs are manufactured from a series of windings of a flat piece of spring wire steel. Most of these springs have multiple coils generally having unrolled lengths of between 10 and 50 inches depending on the requirements of the particular application. The spiral spring provides a change in torque which allows the idler pulley to maintain belt tension over a relatively large change in belt length or idler pulley position. One end of the spring is engaged with an arbor which is in turn secured to the engine block or other supporting structure. The opposite end of the spring is engaged with a housing which is in turn connected to the idler pulley. The spring reacts to forces within the system transmitted by the idler pulley to the housing to maintain constant tension on the belt.

While the prior art tensioning devices perform in an adequate manner, they are not without problems. In order to provide for a large amount of movement of the idler pulley, it is necessary to increase the length of the spiral spring. As the length of the spiral spring increases, the overall diameter of the spring increases, increasing the diameter of the housing which holds the spring. As the diameter of the spring housing increases it becomes more and more difficult to package the tensioning device. With automobiles becoming smaller, under hood space available for engines and their accessories is also being reduced. Therefore, it may be necessary to compromise the design of the prior art tensioning device in order to allow for the packaging of these devices. When the length of the spiral spring is kept to a minimum for packaging considerations, it is not uncommon for the spring to be overstressed as the tensioning device is forced into an overtravel condition during the assembly of the original vehicle or by the fitting of a new belt.

Accordingly, what is needed is a belt tensioning device which is equipped with a spiral spring which is capable of achieving an increased travel while not significantly adding to the packaging problems under the hood.

SUMMARY OF THE INVENTION

The present invention provides the art with such a tensioning device. The present invention discloses a tensioning device which utilizes a double wrap spiral spring which will approximately double the amount of travel of the tensioning device for a given outside diameter. This significant increase in travel allows the load of the tensioning device to be preset at a variety of initial loads to enable the same tensioner to be used over a broad range of applications.

BRIEF DESCRIPTION OF THE DRAWINGS

The above mentioned and other features and objectives of this invention and the manner of attaining them will become more apparent and the invention itself will be better understood by reference to the following description of the invention taken in conjunction with the accompanying drawings wherein.

DESCRIPTION OF THE PREFERRED EMBODIMENT

Figure 1:
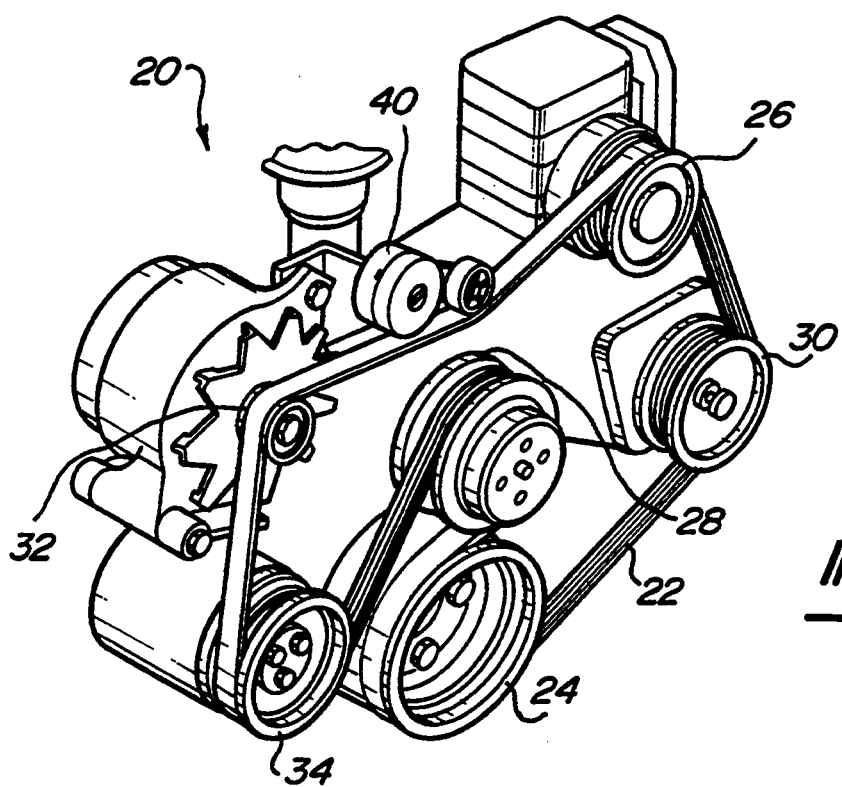
FIG. 1 is a fragmentary isometric view of the new belt tensioner of the present invention shown incorporated in a typical automotive application.

While the various features of this invention are hereinafter illustrated and described as being particularly adapted to provide a belt tensioner for use with an internal combustion engine for a transportation vehicle or the like, it is to be understood that the various features of this invention can be utilized singly or in various combinations thereof to provide a belt tensioner for other types of apparatus as desired. Therefore, this invention is not to be limited to only the embodiments illustrated in the drawings because the drawings are merely utilized to illustrate one of the wide variety of uses of this invention.

Referring now to FIG. 1, an automobile engine is generally indicated by the reference numeral 20 and utilizes an endless power transmission belt 22 for driving a plurality of driven accessories. The improved belt tensioner of the present invention is generally indicated by the reference numeral 40 and is utilized to provide a tensioning force on the belt 22 in a manner hereinafter set forth. The endless power transmission belt 22 may be of any suitable type known in the art.

The belt 22 is driven by a driving sheave 24 which is operatively interconnected to the crankshaft of the engine 20 in a manner well known in the art. The driving sheave 24 drives the belt 22 in an endless path and thereby drives a sheave 26 of a power steering device, a sheave 28 of an engine water pump, a sheave 30 of an air pump of the type used in an anti-pollution system for the engine 20, a sheave 32 of an alternator and a sheave 34 of an air conditioning compressor.

All of the driven sheaves 26, 28, 30, 32 and 34 impose a load on the belt 22. It is known that it is difficult to maintain such a belt 22 under tension with a force sufficient to insure non-slipping engagement and thus driving of the driven sheaves. The improved belt tensioner 40 of the present invention functions in a manner to provide the required tension in the belt 22 to properly power the various accessories without slippage of the belt with respect to the driving or driven sheaves.

Figure 2:
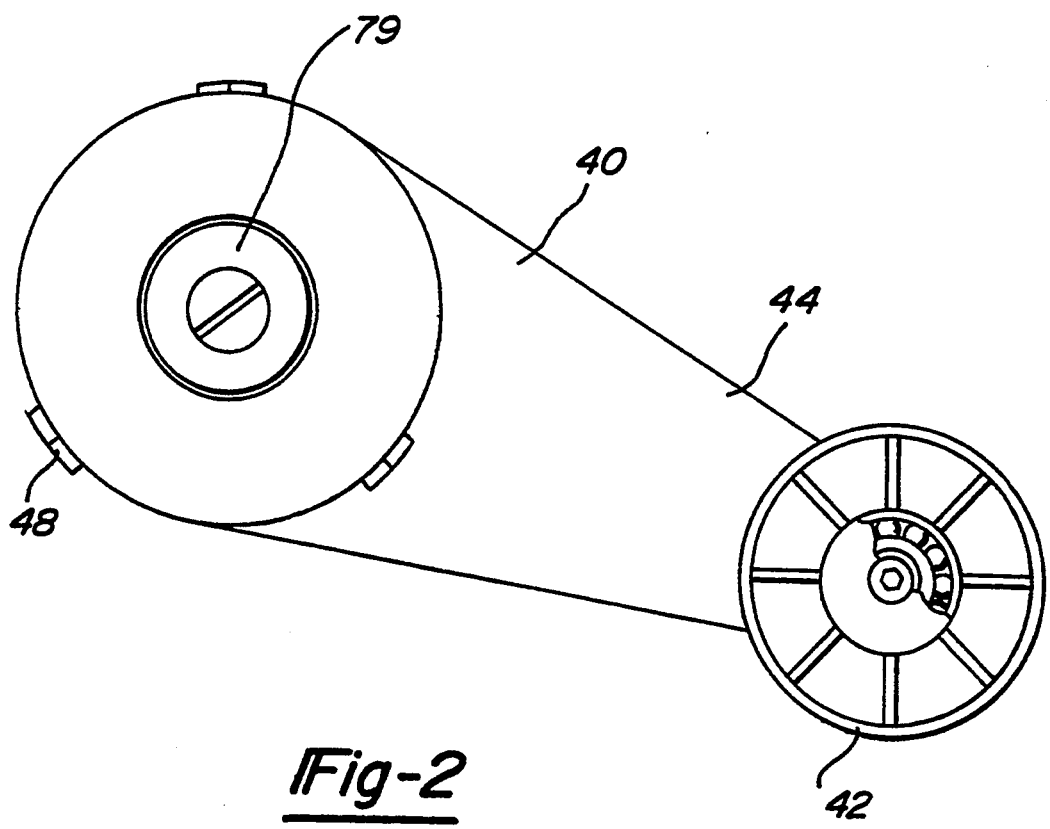
FIG. 2 is a side elevational view of a belt tensioner according to the present invention along with a sheave partially in cross section.
Figure 3:
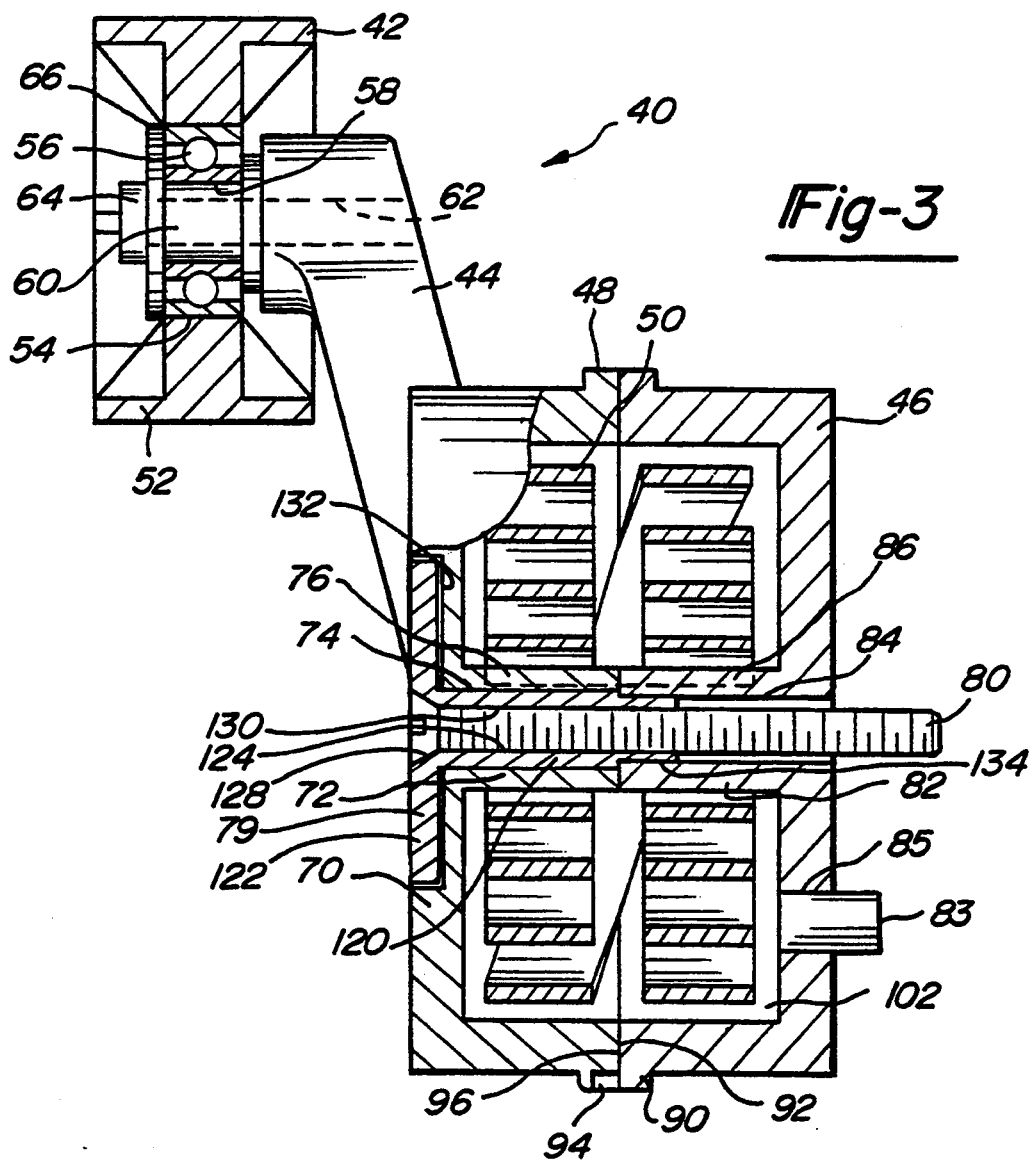
FIG. 3 is a sectional view of the belt tensioner device shown in FIG. 2.
Figure 4:
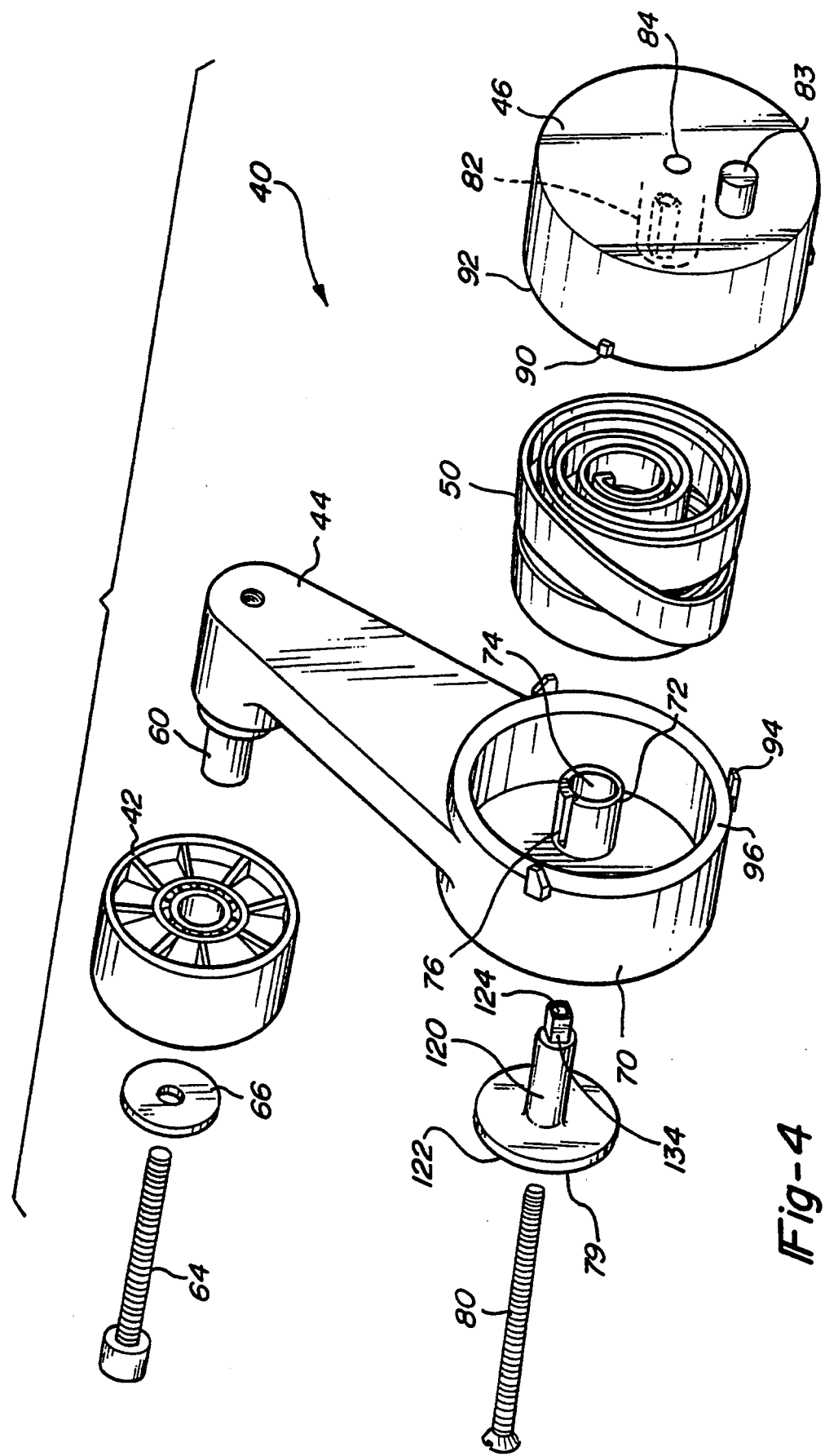
FIG. 4 is an exploded perspective view of the various parts of the belt tensioner of FIGS. 2 and 3.

Referring now to FIGS. 2 through 4, belt tensioner 40 comprises an idler pulley 42, a housing arm 44, a support housing 46, a ratcheting means 48 and a spiral spring 50.

Idler pulley 42 contacts belt 22 and is generally conventional in design comprising a pulley sheave 52 which engages belt 22. Pulley sheave 52 defines an interior surface 54 which is adapted for mounting the outer race of a roller bearing 56. The inner race of the roller bearing 56 is mounted to the exterior surface 58 of a shaft 60. Shaft 60 extends generally perpendicular from one end to housing arm 44. The mounting enables the pulley sheave 52 to freely rotate on shaft 60. Pulley sheave 52 may be held axially on shaft 60 either by a stud, by staking or by providing the shaft 60 with a tapped and threaded bore 62, a bolt 64 and a washer 66 as illustrated in FIG. 3.

Shaft 60 of the present invention, one end of which carries roller bearing 56, is shown integral with housing arm 44. It is within the scope of the present invention to have a separate shaft 60 which has the end opposite to roller bearing 56 press fit or otherwise secured in housing arm 44 in an appropriate bore thereof so that movement of belt 22 and tensioner pulley 42 will be transmitted to housing arm 44 and the various tensioning components carried therein.

The end of housing arm 44 opposite to shaft 60 includes a hollow cylindrical body 70 which receives the various tensioning components interiorily therein as will now be described. Disposed centrally within housing body 70 is a cylindrical extending first arbor 72. Cylindrical first arbor 72 is shown integral with housing body 70 but it is within the scope of the present invention to have a separate first arbor 72 which is then fixedly secured to housing body 70. Arbor 72 includes a through central bore 74 having a circular cross section and a first elongated keyway 76 for receipt of the first inside end of spiral spring 50 as will be described herein. Through bore 74 accommodates a tensioning member 79 which is used to secure belt tensioner 40 onto an engine or an engine bracket.

Support housing 46 is a hollow cylindrical member similar in size and shape to housing body 70. Support housing 46 in conjunction with housing body 70 define an internal cavity 102 which receives the various tensioning components interiorily thereof. A locating pin 83 is press fit into a bore 85 located in the base of support housing 46. Pin 83 is generally flush with the inside surface of support housing 46 and extends past the exterior surface of support housing 46 to act as both a locating pin and a load reaction pin. Disposed centrally within support housing 46 is a cylindrical extending second arbor 82. Cylindrical second arbor 82 is shown integral with support housing 46 but it is within the scope of the present invention to have a separate second arbor 82 which is then fixedly secured to support housing 46.

Figure 5:
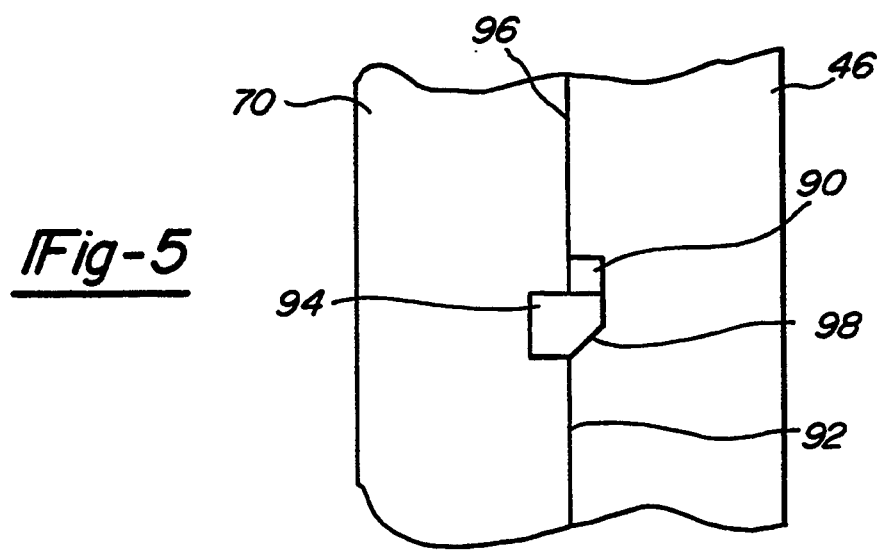
FIG. 5 is an enlarged view of the ratcheting mechanism used to set the preload of the belt tensioner of the present invention.

Second arbor 82 is generally the same size and shape as first arbor 72 and includes a central through bore 84 having a square cross section and a second elongated keyway 86 for receipt of the second inside end of spiral spring 50. Although bore 84 is shown in FIGS. 3 and 5 as having a square cross section, it is within the scope of the present invention for through bore 84 to have a square cross section on the end adjacent to first arbor 72 and then transition into a circular cross section for the remainder of its length as shown in FIG. 4.

Tensioning member 79 is disposed within through bore 74 of housing body 70 and has an annular section 120 and a flange 122. Tensioning member 79 has a central through bore 124 which has a conical section 128 which transitions into a circular section 130. Flange 122 is located at the end of tension member 79 adjacent conical section 128. Housing body 70 has a counter bore 132 for accommodating flange 122 and thus providing for a flush exterior surface. The end of tensioning member 79 opposite to flange 122 has an axially extending square cross sectioned head 134. Head 134 is designed to be received by square cross sectioned through bore 84 of second arbor 82 such that second arbor 82 and tensioning member 79 rotate together.

Ratcheting means 48 is comprised of a plurality of circumferentially spaced radially extending load lugs 90 disposed along the exterior outer edge 92 of support housing 46. Load lugs 90 are generally rectangular in shape and are located at the end of the support housing 46 which is adjacent to housing body 70. Ratcheting means 48 also comprises a plurality of circumferentially spaced radially extending load bearing lugs 94 disposed along the exterior outer edge 96 of housing body 70. Load bearing lugs 94 are generally rectangular in shape and are located at the end of the housing body 70 which is adjacent to support housing 46 for operable engagement with load lugs 90. Load bearing lugs 94 have an angular surface 98 which cooperates with load lugs 90 to ratchet the support housing 46 with respect to the housing body 70 to vary the preload on spring 50 as will be described later herein.

Spiral spring 50 is disposed within cavity 102 which is formed by support housing 46 and housing body 70. The first inside end of spring 50 is located in first elongated keyway 76 and the second inside end of spring 50 is located in second elongated keyway 86 such that rotation of support housing 46 relative to housing body 70 will wind or unwind spring 50 depending on the direction of wind of spring 50 and the direction of relative rotation between housing body 70 and support housing 46. To set the preload of belt tensioner 40, support housing 46 is rotated relative to housing body 70 such that load lugs 90 come in contact with angular surface 98 of load bearing lugs 94. The angular surface 98 slightly cams the two housings 70 and 46 apart until load lugs 90 bear against the opposite side of load bearing lugs 94. The force generated by spring 50 holds the load lugs 90 of support housing 46 against the back side of load bearing lugs 94 of housing body 70. The amount of preload can be increased by continuing to rotate one housing relative to the other until the plurality of load lugs 90 engage the next set of the plurality of load bearing lugs 94 and so on. Once the desired preload has been set, the friction between the two inside ends of the spring 50 and the elongated keyways 76 and 86 will hold the assembly together prior to fitting in the vehicle.

The fitting of the belt tensioner 40 into the vehicle is accomplished by first assembling the belt tensioner and setting the desired preload as described above. The support housing 46 is then placed against the appropriate support structure with locating pin 83 disposed within a corresponding cavity (not shown) located in the supporting structure. Locating pin 83 is used to both set the angular relationship of belt tensioner as well as serving as a reaction point for the torsional loads generated by spring 50. Tensioning member 79 is then assembled through bore 74 and head 134 is engaged with through bore 84. A bolt 80 is then assembled into through bores 124 and 84 and is threaded into a tapped hole (not shown) provided in the support structure or is assembled through a circular cross sectioned bore (not shown) provided in the support structure and secured with a lock washer (not shown) and nut (not shown). By utilizing a tapered head bolt 80, the top of the bolt 80 will be flush with the exterior surface of housing body 70 as the head of bolt 80 will be received in conical section 128 of tensioning member 79.

Once fitted into the vehicle, the belt is placed in contact with idler pulley 42 and spring 50 provides the load for maintaining the proper tension. The travel between successive lugs 90 and 94 is designed to allow idler pulley 42 to have sufficient travel to continuously provide tensioning load to belt 22.

Figure 6:
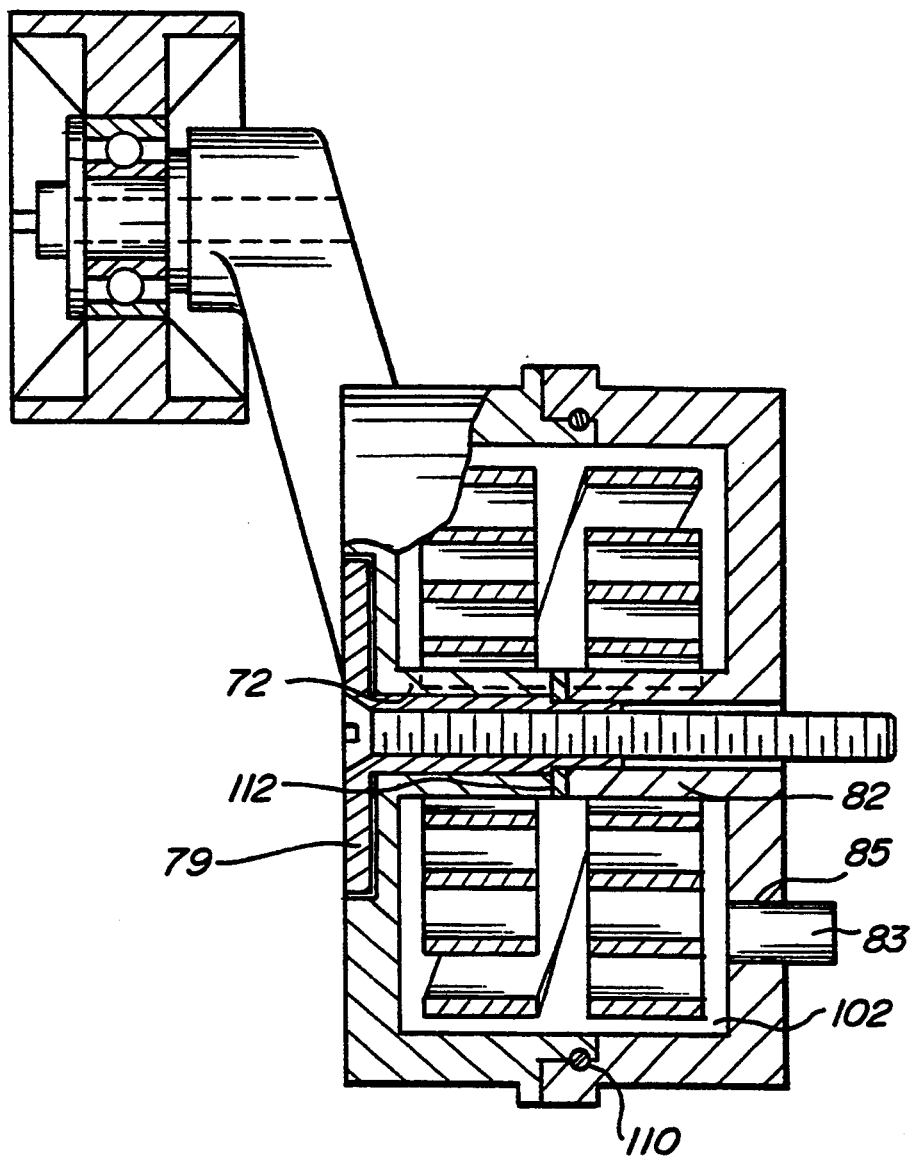
FIG. 6 is similar to FIG. 3 but showing another embodiment of the present invention.

FIG. 6 shows another embodiment of the present invention. The embodiment shown in FIG. 6 is identical to that shown in FIGS. 2-5 except for the addition of a quantity of oil located in cavity 102, a seal 110 provided at the outer edges of housing body 70 and support housing 46, and a seal 112 provided between first and second arbors 72 and 82. Cavity 102 can be filled or partially filled with oil through bore 85 prior to the assembly of pin 83 or a separate bore can be provided in either housing body 70 or support housing 46 for filling cavity 102 after assembly. After filling, the bore can be sealed by methods well known in the art. The oil is used to dampen the vibrations of spring 50 within cavity 102 which might cause objectionable noises during the operation of the engine 20. Operation, of the embodiment shown in FIG. 6 is identical to that described for the embodiment shown in FIGS. 2-5.

Figure 7:
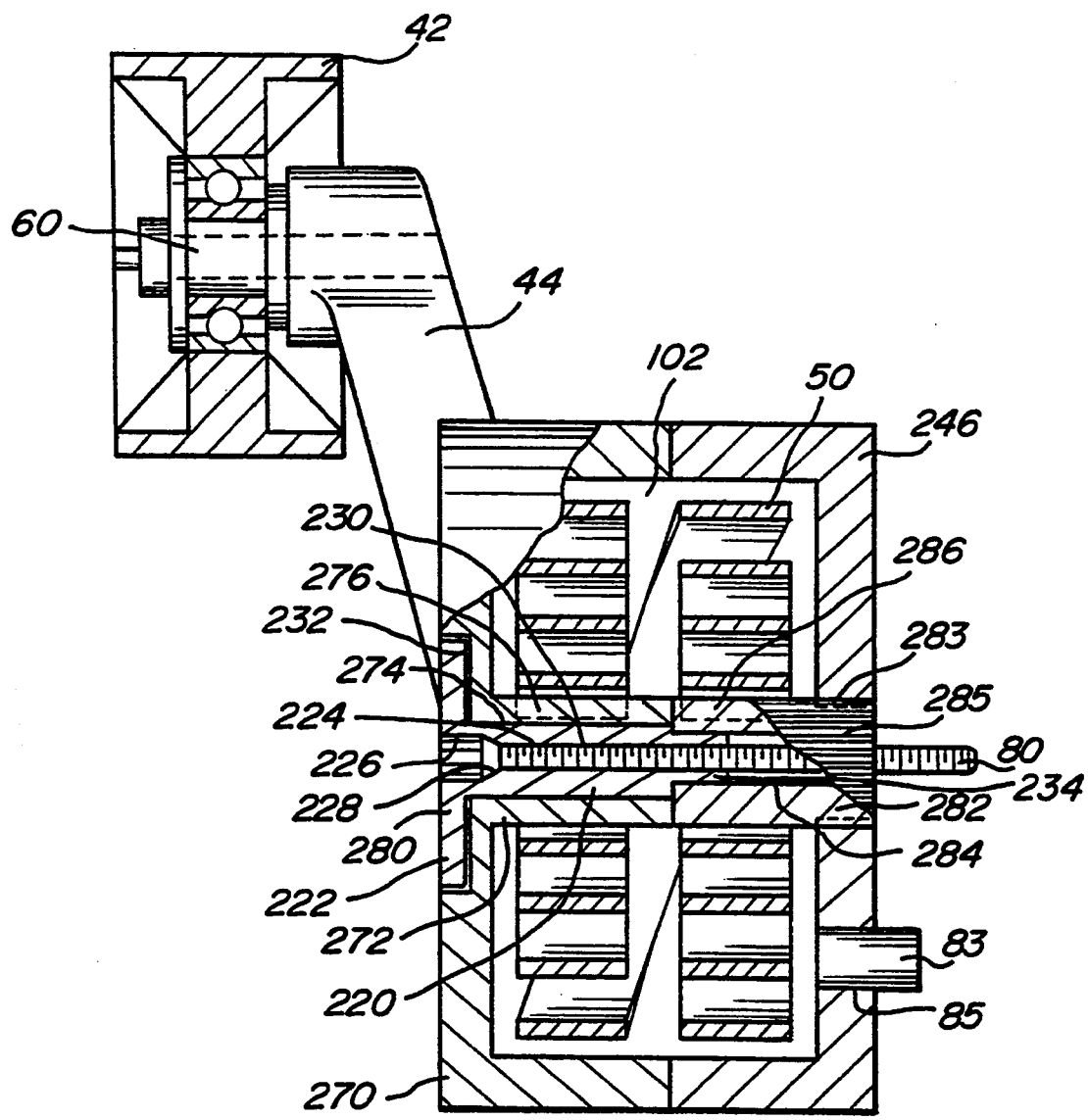
FIG. 7 is a partial sectional view showing another embodiment of the present invention having a retaining means for attaching the inside arbor to the housing.

FIG. 7 shows another embodiment of the present invention. The embodiment shown in FIG. 7 is identical to that shown in FIGS. 2-5 except that the ratcheting means has been replaced by a retaining means which allows a greater amount of flexibility when initially setting the preload of the assembly. Components which are identical to those in FIGS. 2-5 have been given the same reference numerals in FIG. 7.

Idler pulley 42 and its accompanying attachment to shaft 60 of housing arm 44 is identical to the embodiment shown in FIGS. 2-5. The end of housing arm 44 opposite to shaft 60 includes a hollow cylindrical body 270 which receives the various tensioning components interiorally therein as will now be described. Disposed centrally within housing body 270 is a cylindrical extending first arbor 272. Cylindrical first arbor 272 is shown integral with housing body 270 but it is within the scope of the present invention to have a separate first arbor 272 which is then fixedly secured to housing body 270. Arbor 272 includes a central through bore 274 having a circular cross section and a first elongated keyway 276 for receipt of the first inside end of spiral spring 50. Through bore 274 accommodates a tensioning member 280 which is used for setting the preload on spiral spring 50 as will be described herein.

Support housing 246 is a hollow cylindrical member similar in size and shape to housing body 270. Support housing 246 in conjunction with housing body 270 define internal cavity 102 which receives the various tensioning components interiorally thereof. A locating pin 83 is press fit into bore 85 located in the base of support housing 246. Pin 83 is generally flush with the inside surface of support housing 246 and extends past the exterior surface of support housing 246 to act as both a locating pin and a load reaction pin. Disposed centrally within support housing 246 is a cylindrical bore 283.

Second arbor 282 is generally the same size and shape as first arbor 272 and also includes a through bore 284 having a square cross section and a second elongated keyway 286 for receipt of the second inside end of spiral spring 50. Through bore 284 is shown as having a square cross section. It is within the scope of the present invention for through bore 284 to have a square cross section on the end adjacent to first arbor 272 and then transition into a circular cross section for the remainder of its length. The end of second arbor 282 adjacent to support housing 270 has a plurality of splines 285 formed on its exterior which is used for setting the initial preload of the assembly as will be described later herein.

Tensioning member 280 is disposed within through bore 274 of housing body 270 and has an annular section 220 and a flange 222. Tensioning member 280 has a central through bore 224 which has a hexagonal section 226 which transitions into a conical section 228 which then transitions into a circular section 230. Flange 222 is located at the end of tension member 280 adjacent hexagonal section 226. Housing body 270 has a counter bore 232 for accommodating flange 222 and thus providing for a flush exterior surface. The end of tensioning member 280 opposite to flange 222 has an axially extending square cross sectioned head 234. Head 234 is designed to be received by square cross sectioned through bore 284 of second arbor 282 such that second arbor 282 and tensioning member 280 rotate together.

Installation of the belt tensioner begins by placing spiral spring 50 into housing body 270 and engaging the first end of spring 50 in first elongated keyway 276. Tensioning member 280 is then inserted into through bore 274 and bolt 80 is inserted into through bore 224 of tensioning member 280. Second arbor 282 is then positioned over bolt 80 such that square sectioned through bore 284 engages head 234 and second elongated keyway 286 engages the second inside end of spring 50. Support housing 246 is then positioned adjacent to housing body 270 and the assembly is positioned on a fixture or on the mounting frame within the vehicle and bolt 80 is loosely tightened such that second arbor 282 does not engage cylindrical bore 283 of support housing 246. A torque wrench or other suitable torquing means is inserted into hexagonal section 226 of tensioning member 280 and spring 50 is set at a predetermined load. Upon reaching the predetermined load, an axial force is exerted on tensioner member 280 which is sufficient to broach the plurality of splines 285 of second arbor 282 into cylindrical bore 283 of support housing 246. The torque wrench is then removed and bolt 80 is tightened to a specified torque to complete the installation. The tightening of bolt 80 acts to further engage splines 285 within cylindrical bore 283.

The embodiment shown in FIG. 7 enables a single tensioner to be used throughout a variety of vehicle applications. This embodiment allows the preload on spring 50 to be preset to any level during installation which in turn provides a specific amount of tensioning load on belt 22. Therefore, one tensioner may be utilized for a vehicle having a variety of options as well as for a variety of vehicles having a variety of engines, each engine having its own tensioning requirements. In a manner similar to that described for the embodiment shown in FIG. 6, oil can be introduced into cavity 102 with the appropriate sealing devices to dampen spring 50.

While the above detailed description describes the preferred embodiments of the present invention, it should be understood that the present invention is susceptible to modification, variation and alteration without deviating from the scope and fair meaning of the subjoined claims.

What is claimed is:

1. A belt tensioner for constantly, automatically maintaining substantially constant tension in an endless belt of a belt drive system comprising:
   an idler pulley adapted to engage said endless belt;
   an elongated arm extending from said idler pulley, said elongated arm having a first end and a second end, said first end rotatably supporting said idler pulley;
   a first housing secured to said second end of said elongated arm; said first housing defining a portion of an annular cavity;
   a second housing disposed adjacent to said first housing and rotatably supporting said first housing, said second housing adapted to be fixed to a supporting surface such that said first housing rotates relative to said second housing, said second housing defining the remainder of said annular cavity; and
   a double unit spiral spring disposed in said annular cavity, said double unit spiral spring having a first inside end and a second inside end, said first inside end in engagement with said first housing, said second inside end in engagement with said second housing such that forces from said belt applied to said idler pulley are constantly resisted by said double unit spiral spring acting between said first and second housings, said double unit spiral spring maintaining static tension in said belt drive system.

2. The belt tensioner of claim 1 further comprising a first arbor fixedly secured to said first housing, said first arbor extending into said first cavity, said first inside end of said double unit spiral spring being in engagement with said first arbor.

3. The belt tensioner of claim 2 wherein said first arbor has a first slot therein, said double unit spiral spring having a first inner coil provided with said first inside end bent at an angle relative to said first inner coil and being received in said first slot to interconnect said double unit spiral spring to said first arbor.

4. The belt tensioner of claim 1 further comprising a second arbor fixedly secured to said second housing, said second arbor extending into said second cavity, said second inside end of said double unit spiral spring being in engagement with said second arbor.

5. The belt tensioner of claim 4 wherein said second arbor has a second slot therein, said double unit spiral spring having a second inner coil provided with said second inside end bent at an angle relative to said second inner coil and being received in said second slot to interconnect said double unit spiral spring to said second arbor.

6. The belt tensioner of claim 1 wherein said first and second cavities are at least partially filled with a fluid to act as a fluid dampener for said belt tensioner.

7. The belt tensioner of claim 6 wherein said fluid is oil.

8. The belt tensioner of claim 1 further comprising means for retaining said double unit spiral spring in a loaded condition such that an initial predetermined tensioning load is applied to said endless belt.

9. The belt tensioner of claim 8 wherein said retaining means includes ratcheting means.

10. The belt tensioner of claim 9 wherein said ratcheting means comprises:
    a plurality of circumferentially spaced radially extending load reaction lugs disposed on the exterior of said first housing;
    a plurality of circumferentially spaced radially extending load lugs disposed on the exterior of said second housing; said plurality of load lugs cooperating with said plurality of load reaction lugs to prohibit rotation of said first housing with respect to said second housing.

11. The belt tensioner of claim 10 wherein said plurality of load reaction lugs have a camming surface on one side thereof, said camming surface cooperating with said load lugs to allow rotation of said first housing with respect to said second housing in one direction only.

12. The belt tensioner of claim 8 wherein said second housing comprises:
    a housing body defining said second cavity;
    an arbor disposed within said housing body, said arbor in engagement with said second inside end of said spiral spring and with said housing body; and
    said retaining means includes a toothed engagement of said arbor with said housing body.

13. A belt tensioner for constantly, automatically maintaining substantially constant tension in an endless belt of a belt drive system comprising:
  an idler pulley adapted to engage said endless belt;
  an elongated arm extending from said idler pulley, said elongated arm having a first end and a second end, said first end rotatably supporting said idler pulley;
  a first housing secured to said second end of said elongated arm; said first housing defining a first cavity;
  a first arbor fixedly secured to said first housing and extending into said first cavity;
  a second housing disposed adjacent to said first housing and rotatably supporting said first housing; said second housing adapted to be fixed to a supporting surface such that said first housing rotates relative to said supporting surface, said second housing defining a second cavity located adjacent to said first cavity;
  a second arbor fixedly secured to said second housing and extending into said second cavity;
  a double unit spiral spring disposed in said first and second cavities, said double unit spiral spring having a first inside end and a second inside end, said first inside end in engagement with said first arbor, said second inside end in engagement with said second arbor such that forces from said belt applied to said idler pulley are constantly resisted by said double unit spiral spring, said double unit spiral spring maintaining static tension in said belt drive system; and
  ratcheting means for retaining said double unit spiral spring in a loaded condition.

14. The belt tensioner of claim 13 wherein said first and second cavities are at least partially filled with a fluid to act as a fluid dampener for said belt tensioner.

15. The belt tensioner of claim 14 wherein said fluid is oil.

16. The belt tensioner of claim 13 wherein said first arbor has a first slot therein, said double unit spiral spring having a first inner coil provided with said first inside end bent at an angle relative to said first inner coil and being received in said first slot to interconnect said double unit spiral spring to said first arbor.

17. The belt tensioner of claim 13 wherein said second arbor has a second slot therein, said double unit spiral spring having a second inner coil provided with said second inside end bent at an angle relative to said second inner coil and being received in said second slot to interconnect said double unit spiral spring to said second arbor.

18. The belt tensioner of claim 13 wherein said ratcheting means comprise:
  a plurality of circumferentially spaced radially extending load reaction lugs disposed on the exterior of said first housing;
  a plurality of circumferentially spaced radially extending load lugs disposed on the exterior of said second housing; said plurality of load lugs cooperating with said plurality of load reaction lugs to prohibit rotation of said first housing with respect to said second housing.

19. The belt tensioner of claim 18 wherein said plurality of load reaction lugs have a camming surface on one side thereof, said camming surface cooperating with said load lugs to allow rotation of said first housing with respect to said second housing in one direction only.

20. A belt tensioner for constantly, automatically maintaining substantially constant tension in an endless belt of a belt drive system comprising:
  an idler pulley adapted to engage said endless belt;
  an elongated arm extending from said idler pulley, said elongated arm having a first end and a second end, said first end rotatably supporting said idler pulley;
  a first housing secured to said second end of said elongated arm; said first housing defining a first cavity;
  a second housing disposed adjacent to said first housing and rotatably supporting said first housing, said second housing adapted to be fixed to a supporting surface such that said first housing rotates relative to said supporting surface, said second housing defining a second cavity located adjacent to said first cavity, said first and second cavities being at least partially filled with fluid to act as a fluid dampener for said belt tensioner; and
  a double unit spiral spring disposed in said first and second cavities, said double unit spiral spring having a first inside end and a second inside end, said first inside end in engagement with said first housing, said second inside end in engagement with said second housing such that forces from said belt applied to said idler pulley are constantly resisted by said double unit spiral spring, said double unit spiral spring maintaining static tension in said belt drive system.

21. The belt tensioner of claim 20 wherein said fluid is oil.

22. A belt tensioner for constantly, automatically maintaining substantially constant tension in an endless belt of a belt drive system comprising:
  an idler pulley adapted to engage said endless belt;
  an elongated arm extending from said idler pulley, said elongated arm having a first end and a second end, said first end rotatably supporting said idler pulley;
  a first housing secured to said second end of said elongated arm; said first housing defining a first cavity;
  a second housing disposed adjacent to said first housing and rotatably supporting said first housing, said second housing adapted to be fixed to a supporting surface such that said first housing rotates relative to said supporting surface, said second housing defining a second cavity located adjacent to said first cavity;
  a double unit spiral spring disposed in said first and second cavities, said double unit spiral spring having a first inside end and a second inside end, said first inside end in engagement with said first housing, said second inside end in engagement with said second housing such that forces from said belt applied to said idler pulley are constantly resisted by said double unit spiral spring, said double unit spiral spring maintaining static tension in said belt drive system; and
  means for retaining said double unit spiral spring in a loaded condition such that an initial predetermined tensioning load is applied to said endless belt, said retaining means including ratcheting means, said ratcheting means comprising:
  a plurality of circumferentially spaced radially extending load reaction lugs disposed on the exterior of said first housing; and a plurality of circumferentially spaced radially extending load lugs disposed on the exterior of said second housing, said plurality of load lugs cooperating with said plurality of load reaction lugs to prohibit rotation of said first housing with respect to said second housing.

23. The belt tensioner of claim 22 wherein said plurality of load reaction lugs have a camming surface on one side thereof, said camming surface cooperating with said load lugs to allow rotation of said first housing with respect to said second housing in one direction only.

24. The belt tensioner of claim 22 wherein said second housing comprises:
a housing body defining said second cavity;
an arbor disposed within said housing body, said arbor in engagement with said second inside end of said spiral spring and with said housing body; and
said retaining means includes a toothed engagement of said arbor with said housing body.

* * * * *